United States Patent [19]

Neskora et al.

[11] 3,833,351

[45] Sept. 3, 1974

[54] CONTINUOUS PREPARATION OF PURE METALS BY HYDROGEN REDUCTION

[75] Inventors: Daniel R. Neskora; Robert L. Brown; Cedomir M. Sliepcevich, all of Norman, Okla.

[73] Assignee: University Engineers, Inc., Norman, Okla.

[22] Filed: July 20, 1973

[21] Appl. No.: 381,051

Related U.S. Application Data

[63] Continuation-in-part of Ser. No. 332,679, Feb. 15, 1973.

[52] U.S. Cl.................... 75/0.5 A, 75/108, 75/117, 75/118, 75/119
[51] Int. Cl............................................ C22b 23/04
[58] Field of Search....... 75/15 A, 15 AA, 117, 119, 75/118, 108, 109

[56] References Cited
UNITED STATES PATENTS

| | | | |
|---|---|---|---|
| 2,753,257 | 7/1956 | Nashner et al. | 75/108 |
| 2,836,485 | 5/1958 | Schaufelberger | 75/0.5 |
| 2,867,528 | 1/1959 | Evans | 75/109 |
| 3,761,250 | 9/1973 | Weir et al. | 75/108 |

Primary Examiner—L. Dewayne Rutledge
Assistant Examiner—Arthur J. Steiner
Attorney, Agent, or Firm—Dunlap, Laney, Hessin, Dougherty & Codding

[57] ABSTRACT

A process for continuously recovering metal powders of high purity from acid or ammoniacal leach solutions which comprises conditioning the leach solution to attain a selected free ammonia to metal mol ratio in the general range of from about 0.0:1 to about 6:1, depending upon the metal to be reduced, then continuously passing the conditioned leach solution through a tubular reactor under steady state conditions in modified plug flow in which localized, limited backmixing occurs, while continuously introducing a reducing gas to the inlet end of the tubular reactor to agitate the pre-treated leach solution as it passes through the reactor and to continuously reduce selected metal ions therein and yield insoluble metal powder. A temperature gradient is preferably maintained over the length of the tubular reactor, from ambient temperature at the inlet to the reactor, to a temperature preferably exceeding about 200°F at the outlet end of the reactor.

27 Claims, 5 Drawing Figures

CONTINUOUS PREPARATION OF PURE METALS BY HYDROGEN REDUCTION

RELATED APPLICATIONS

This application is a continuation-in-part of our U.S. Pat. application Ser. No. 332,679 filed Feb. 15, 1973, and entitled "Continuous Preparation of Pure Metals by Hydrogen Reduction".

BACKGROUND OF THE INVENTION

1. Field of the Invention

This invention relates to the recovery of certain high purity metals from metal containing ores or raw materials, and more particularly, to a continuous hydrometallurgical process for continuously preparing a relatively pure metal selected from the group consisting of copper, nickel, cobalt, silver and gold by reduction with hydrogen gas.

2. Brief Description of the Prior Art

It is a known present commercial practice to use hydrogen gas to treat leach solutions containing copper, nickel or other metal values to recover relatively high purity metal powder by hydrometallurgical reduction. In general, the reduction with hydrogen gas is carried out by a batch process, and the prior patents in this field refer most frequently to conducting the reduction in an autoclave under described batch process conditions. Although a very few U.S. Pat. Nos. (2,796,342; 2,836,485 and 2,805,149) refer to the possibility of conducting the hydrogen reduction of copper ions in solutions on a continuous basis, no actual successful, truly continuous runs are described in detail in such patents. On the contrary, where one such attempted continuous procedure is described in detail in a working example appearing in U.S. Pat. No. 2,753,257, the context of that description clearly indicates that the attempted continuous run was somewhat less successful than the batch runs also there described. It has moreover been prevalently supposed by those possessing significant acumen in this technological field that successful, truly continuous operation of a process yielding copper, nickel, cobalt, silver or gold metal from a leach solution by hydrometallurgical reduction cannot be effected in a way showing advantage with respect to batch or semi-continuous procedures.

Although many reasons for this pessimistic attitude toward a continuous reduction process undoubtedly exist, one of the most vociferously asserted has been the supposed impediment posed by the character of the system which must be processed, and the complex nature of the chemistry involved. From the knowledge of mechanisms observed and deduced from batch, semi-continuous and parallel flow reductions, it has been concluded that seeding or catalysis (nucleation) and densification, with the concurrent development of a slurry, plays an important role in the hydrometallurgical production of very pure copper metal at high conversion rates. In the words of one expert in the field as recently as within the last one and one-half years, "nucleation, densification and uniform growth" are stages in phenomena which "are the product of semi-continuous operation," and "could not be achieved in continuous operations." Of similar import is the comment of another contemporary expert that "continuous flow has been proposed for many years in the precipitation of metals by $H_2$, etc. from aqueous solutions. It has not been shown to be successful, either technically or economically. People familiar with the field recognize that the conventional semi-continuous processes in use in this field provide facilities of control that cannot possibly be achieved by continuous processes."

In sum, the general consensus of those skilled in the art of hydrometallurgical reduction of copper, nickel and certain related metals, and precipitation of these metals from solution, is that it is fundamentally infeasible and/or impossible to achieve continuous precipitation of metal powders from solution under the impetus of gaseous reduction as continuously applied. Expertise in this area does agree, however, that hydrogen reduction of copper values in solution, when carried out on a batch or semi-continuous basis, does afford significant advantages over smelting, electrolytic processing, or cementation metal recovery methods. These advantages are broadly based upon avoidance of ecological pollution, purity of the metal product yielded, efficiency of recovery, selectivity of control conditions and lower plant investment costs.

BRIEF DESCRIPTION OF THE PRESENT INVENTION

The present invention provides a process for efficiently and economically recovering metals of high purity and controlled particle size from a solution by gaseous reduction. The process is particularly useful in the recovery of high purity copper and nickel metal. The residence times employed in the continuous process are shorter, in general, by a factor of about 10 than the best residence times previously realized in batch or semi-continuous processes.

Broadly described, the process of the invention comprises passing a leach solution containing reduceable copper, nickel, cobalt, silver or gold, and adjusted to a selected pH dependent upon the metal to be recovered, continuously through a tubular reactor in intimate admixture with excess reducing gas (and preferably hydrogen) which, by sparging, creates limited localized backmixing of the reaction mixture, and a consequent departure from ideal plug flow conditions. The temperature in at least a portion of the reactor is in excess of 200°F. This may be a localized temperature limitation obtaining only near the discharge end of the reactor, or isothermal conditions may be utilized over the entire reactor length. Preferably, a temperature gradient or profile exists over the length of the reactor, and is from ambient temperature at the inlet of the reactor, to a temperature in excess of about 200°F at the outlet of the reactor. Many other preferred conditions exist for optimum practice of the process, and will be hereinafter described in detail.

Mechanistically speaking, the entire mechanism which has permitted the continuous process of the invention to achieve remarkable and surprising success is not thoroughly and completely understood by us. We believe, however, that the modified plug flow with localized and limited backmixing occurring in the tubular reactor operated under steady state conditions results in an optimized environment for the most efficient occurrence of nucleation and densification. Referring specifically to the recovery of copper metal merely for the purpose of illustrative discussion, at the inlet end of the reactor, small, amorphous nuclei or particles of a complex formed between copper and ammonia ions are believed to be generated through appropriate pretreatment, and are suspended in the turbulent or agitated reaction mixture as it moves downstream in the reactor. These particles of the complex then become, at a downstream location in the reactor, the source of very small, highly active particles of copper metal, and these in turn, as has been previously known, function catalytically to enhance the reduction of the copper ions remaining in solution — this occurring at locations yet further downstream in the reactor.

Steady state conditions are maintained in the tubular reactor, with the turbulence and flow rate being sufficient to entrain and sweep out the solid particles of metal thrown out of solution. There is, therefore, a continuous formation of complex, followed by movement of the complex to a different reactor locale as it commences to function as the source of very small or dendritic copper particles which have a highly activated surface of transient duration, which copper particles then exert a catalytic effect to form the situs for the deposition of additional quantities of copper metal by densification in the extreme downstream portion of the reactor. It will be perceived that under the steady state conditions described, no single particle or particles having deposited copper thereon are permitted to remain in the same situs to clog or choke the reactor, or to interfere with the formation of new particles continuously, with particle genesis and growth being controlled and allowed to occur in an optimum progressive manner in a downstream direction. Generally, the same phenomena and results obtain in the case of the other metal values reduceable by the process of the present invention.

A broad object of the invention is to provide a continuous process for recovering very high purity metal from an aqueous solution by contacting the solution with a reducing gas.

An important object of the present invention is to provide a process for recovering metals from aqueous solutions containing gas reduceable metal values at relatively low capital investment as compared to prior ion exchange, electrolytic and smelting techniques.

A further and more specific object of the invention is to provide a process for recovering copper from aqueous solutions by reduction of copper ions therein with hydrogen gas, such metal recovery being effected with relatively low energy consumption as compared with electrolytic refining and other prior processes used for recovering copper metal from aqueous solutions.

Another important advantage of the present invention is the ability to use the process of the invention for economically recovering metallic copper from aqueous leach solutions which are relatively low in their concentration of reduceable copper values and not normally recoverable economically by conventional batch type hydrogen reduction operations.

Another object of the invention is to produce metallic copper by gaseous reduction of an aqueous leach solution derived directly from in situ leaching.

Another objective of the invention is to provide a method for continuously producing metallic copper in a controlled manner, so that the physical characteristics of the copper powder yielded in the course of the process can be controlled and tailored to meet the requirements of specific powder metallurgy applications.

Another object of the invention is to provide a process for continuously producing copper, nickel, cobalt, silver or gold metal by passing a leach solution through a tubular reaction in contact with hydrogen gas, under conditions requiring a very low residence time of the reaction mixture in the reactor.

An additional object of the invention is to provide a continuous, steady-state hydrogen reduction process for producing high purity metals, which process is characterized in having substantially increased conversion rates which enable the speed of processing of a leach solution to be increased from five to ten times that which is currently attained in batch autoclave systems utilizing the principle of hydrogen reduction.

Another objective of the invention is to successfully carry out the recovery of a metal selected from the group consisting of copper, nickel, cobalt, silver and gold by hydrogen reduction effected in a tubular reactor through which an aqueous solution containing the copper values to be recovered is moved in modified plug flow at steady state conditions.

A further object of the invention is to recover both nickel and copper in a two step continuous process using certain inherent metal values present in the raw leach solution for effecting catalytic reduction of the nickel.

Another object of the invention is to selectively pretreat copper leach solutions containing reduceable copper values prior to reducing such pre-treated leach solutions in a tubular reactor to effect hydrogen reduction of the copper values therein, whereby, by the use of such pretreatment, the formation of excessive corrosive acid solutions in the reactor is obviated or substantially reduced.

Another object of the invention is to provide a selectively controlled environment in which nucleation and densification are allowed to occur in the process of continuously reducing certain metallic ions to free particulate metal in a way such that the metal product is not plated or deposited upon the walls of the reactor vessel in significant quantities.

A further object of the present invention is to carry out a continuous process for effecting gaseous reduction of copper ions in aqueous solution, so that metallic copper particles in substantial yields are realized by the process without the concurrent formation of undesirable stable basic salts, including antlerite and brochantite.

Additional objects and advantages of the invention will become apparent as the following detailed description of certain preferred embodiments of the invention is read in conjunction with the accompanying drawings which illustrate the invention.

BRIEF DESCRIPTION OF THE DRAWINGS

FIG. 5 is a schematic flow diagram illustrating the use of the process of the invention is the recovery of both copper and nickel from an aqueous leach solution.

DETAILED DESCRIPTION OF PREFERRED EMBODIMENTS OF THE INVENTION

Figure 1:
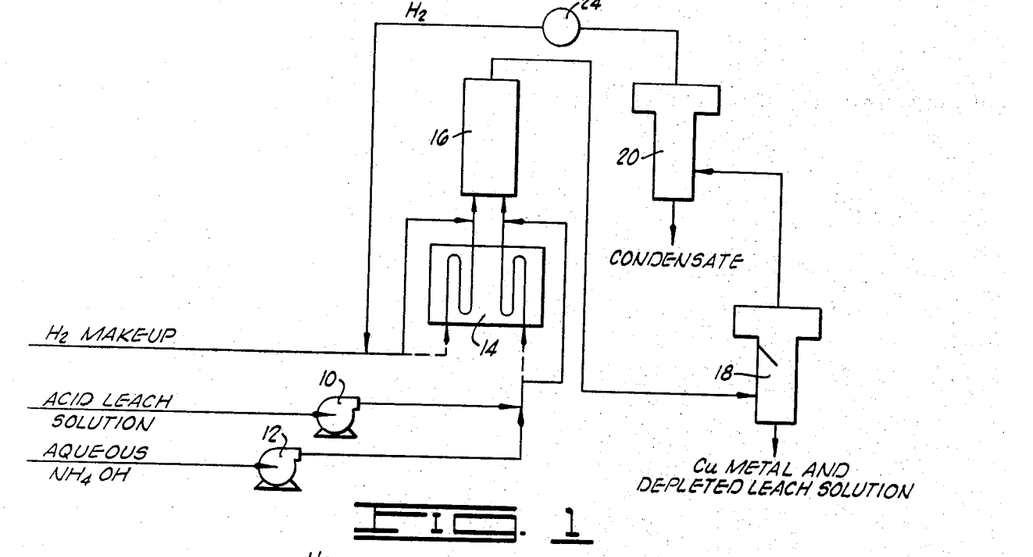
Fig. 1 is a schematic flow diagram illustrating one embodiment of the process of the invention as it is used in the recovery of particulate metallic copper from an acid leach solution.

Referring initially to FIG. 1 of the drawing, shown therein is a simplified flow diagram illustrating schematically various elements of apparatus used in the process of the invention, and the sequence of their use. Broadly described, the system used in the continuous hydrogen reduction process of the invention may be considered as including a feed system, an optional pre-treating section in which the raw leach solution is pre-treated, and optionally heated in a manner hereinafter described, a tubular, up-flow reactor and a product separation system. The method of the invention is applicable to both acidic and ammoniacal leach solutions, but will be initially described, in referring to FIG. 1, for the case of a copper leach solution derived from sulfuric acid leach facilitites.

The acid leach solution containing dissolved copper sulfate enters the process through a pump 10 by which the acid leach solution is pressured to a pressure which, in conjunction with the hydrogen partial pressure, is sufficient (as to total pressure) to prevent the leach solution from boiling. For operation over the preferred maximum temperature range of from about 300°F to about 450°F, the total pressure employed is from about 300 psi to about 600 psi. In a preferred embodiment of the invention, a controlled amount of ammonium hydroxide solution is pumped by pump 12 into the pressurized strongly acid leach solution so as to condition the leach solution feed stock to a free ammonia to copper ratio of from about 0.1:1 to about 1.6:1. In the case of some weakly acid copper leach solutions, the addition of the ammonium hydroxide to pre-condition the leach solution in the manner described may be omitted. Where pre-treatment is carried out, the pH of an equivalent synthetic leach solution is monitored and, subject to adjustment of the free ammonia to metal ratio within the range stated, is preferably maintained from about 4.0 to 7.0 for carrying out the copper reduction. The pre-conditioning or pretreatment of the leach solution functions to optimize the ammonia to copper ratio so as to achieve optimum formation of the copper-ammonia complex which is formed, as hereinafter described, immediately after the pre-treated leach solution enters the reactor in contact with hydrogen gas. The value of the ammonia pre-treatment to a selected, applicable free ammonia to metal mole ratio is individually and independently determined for each of the other metal values hereinafter considered.

The pre-conditioned feed solution can be fed to a preheater 14 which functions to pre-heat the feed solution to a temperature of from about 200°F to about 600°F. In the pre-heater 14, hydrogen gas employed in the reduction carried out in the tubular reactor may also be pre-heated, in isolation from the leach solution, prior to charging the gas to the reactor. Pre-heated and pre-treated conditioned leach solution and pre-heated hydrogen gas are then both charged concurrently to the tubular reactor 16, which is preferably a vertically extending elongated tubular member thermostated over its length for precise temperature control. The tubular reactor is preferably constructed and equipped so that either non-isothermal or isothermal operation can be carried out. Where non-isothermal procedure is employed, the pre-heater 14 is not utilized, and both the hydrogen gas and the pre-treated leach solution are charged to the tubular reactor 16 at ambient temperature.

The dimensions of the reactor are not particularly critical, except insofar as the length to diameter ratio is concerned. This ratio is preferably from about 10:1 to about 100:1, with the most suitable length to diameter ratio being about 40:1 to 60:1. As will be hereinafter explained, a dip tube may be employed in conjunction with the tubular reactor to facilitate selective adjustment of the effective reactor volume.

The quantity and rate at which hydrogen gas is charged to the reactor is to some extent empirically determined. As a basic criteria for the manner of hydrogen introduction to the reactor 16, the amount of hydrogen introduced to the reactor must be in excess of that required for the stoichiometric reduction of all metal values contained in the leach solution, and reduceable under the conditions obtaining in the reactor. Since the adjustment of these conditions, including the selective pre-treatment of the leach feed solution, is such that the reduction effected is primarily that of copper, the quantity of hydrogen passed through the reactor will, in general, exceed the stoichiometric quantity of hydrogen reduceable copper ions carried in the solution. Excess hydrogen is needed in order to achieve the agitation and turbulence in the reaction mixture which is required to entrain solid particles of complex and carry through the reactor, copper metal which is formed in the course of the reaction, and prevent deposition of these solids within the reactor. This consideration also determines the rate at which both the pre-treated feed solution and the hydrogen are passed through the reactor. The flow rate of the reaction mixture through the reactor, and the amount of excess hydrogen provided, are such that progressive production and growth of particles of copper metal are realized over the length of the reactor, and no undesirable deposition of solids or precipitation of intolerable amounts of other compounds are permitted to occur within the reactor. The condition sought is plug flow within the reactor, modified by the occurrence of localized and limited backmixing, which has the effect of procuring efficient recovery of reduceable copper ions from the leach solution charged to the reactor, and optimization of nucleation and densification within the reactor.

It may here be pointed out that the rate of hydrogen flow and quantity of excess hydrogen which is provided in the reactor 16 may be decreased where a static mixer is provided in the reactor. The static mixer can, in other words, generate a portion of the turbulence or localized backmixing which is required, and which is otherwise totally achieved by hydrogen gas sparging. Suitable static mixers are well understood in the art, and can be incorporated in the tubular reactor without difficulty. Moreover, other effective reducing gases, such as carbon monoxide, can also be utilized.

The total pressure which is utilized in the reactor 16 is related to the maximum temperature therein, and to the hydrogen partial pressure.

The partial pressure of hydrogen in the reactor is preferably always at least 50 psig. Attainment of this minimal hydrogen partial pressure, and development of sufficient total pressure in the reactor to prevent boiling of the leach solution will, of course, be dependent on the composition of the hydrogen-containing gas charged to the reactor, and the maximum temperature obtaining in the reactor. Where the maximum reactor temperature is as low as 200°F, and pure hydrogen is charged to the reactor, the gas need only be pressurized to about 50 psig. When the maximum reactor temperature is about 300°F, and pure hydrogen is utilized, the gas should be pressurized to about 300 psi in order to prevent boiling of the leach solution, and satisfy the minimum hydrogen partial pressure desiderata. If a mixture of gases, including hydrogen, is charged to the reactor operated at 300°F, the gaseous mixture must be further pressurized to provide the desired minimum hydrogen partial pressure, and also sufficient total pressure to prevent boiling of the solution.

The leach solutions charged to the reactor 16 can be relatively low in the concentration of the metal values to be reduced, as compared to the concentration of these metal values in leach solutions as they have been subjected to previously used batch and semi-continuous hydrogen reduction methods. Thus, for example, in economically attractive copper recovery using the present invention, leach solutions derived from the acid leaching of copper ore may contain as little as 2 to 10 grams of copper per liter of leach solution. With non-isothermal operation of the reactor 16 under which the inlet end of the reactor is maintained at ambient temperature and the outlet thereof maintained at about 400°F, copper yields in excess of 90 percent (in terms of absolute conversion of the reduceable copper ions in the feed solution) can be obtained. Steady state conversion rates of 15 to 30 pounds copper per hour per cubic foot of reactor volume are easily realized.

The effluent from the reactor 16 is passed to a high pressure separator 18 where pure particulate copper metal and depleted leach solution are separated from gaseous products of the reaction, and are passed to conventional filtration and/or centrifuging steps for recovery of the copper metal. The product copper is then washed and dried in an inert atmosphere. The gases and volatile materials from the reactor pass from the separator 18 to a knockout condenser 20 where any condensible gases or vapors are removed from hydrogen gas. The hydrogen gas is then recycled by means of a suitable compressor 24 and recharged, after preheating if desired, to the reactor 16. Using the system depicted in FIG. 1, product copper has been recovered which, as analyzed by X-ray diffraction, attains a purity of 99.9 percent or higher.

Figure 2:
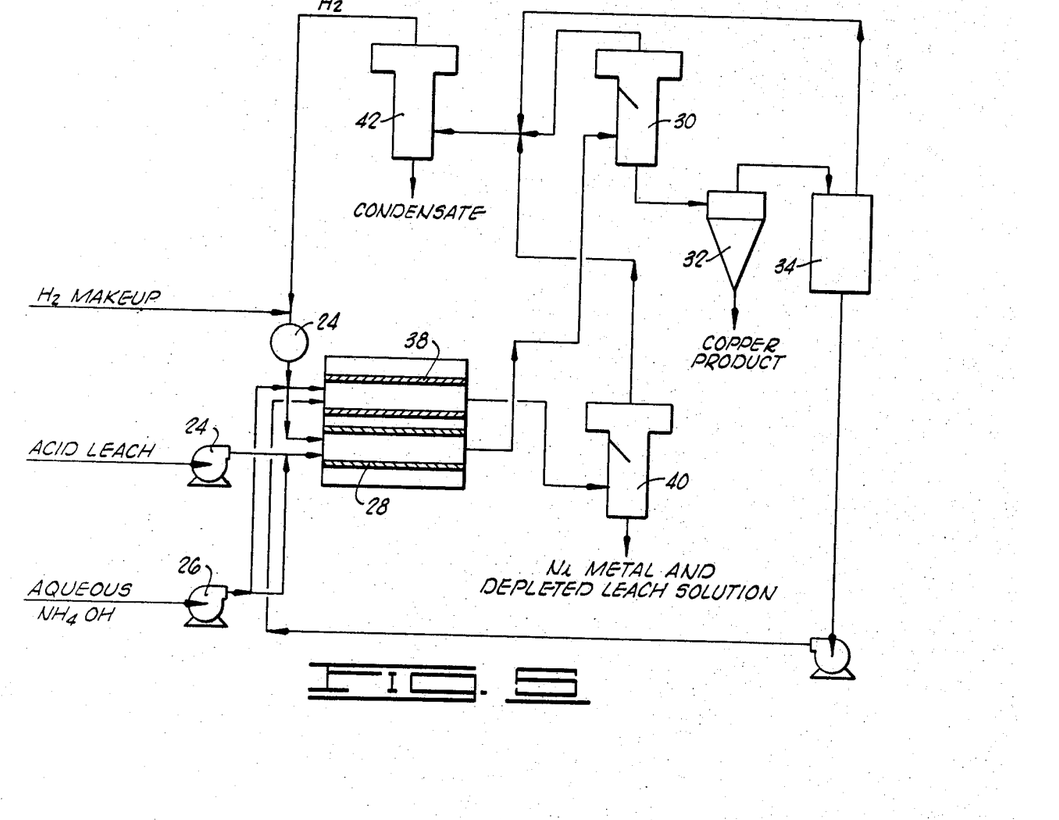
FIG. 2 is a diagrammatic illustration of conditions obtaining, and reaction mechanisms occurring, in the tubular reactor utilized in the copper recovery process of the invention.

FIG. 2 is a diagrammatic illustration of the correlation of particle formation and copper precipitation occurring within the tubular reactor 16, and the temperature profile maintained in the reactor when the reactor is operated in the preferred non-isothermal manner for the recovery of copper metal. It is postulated in the diagram that the tubular reactor 16 is, according to preferred practice, a vertically extending reactor, and is operated from an ambient temperature of about 75°F at its inlet to a temperature exceeding about 400°F at its outlet. It will be perceived that with pre-treatment at the inlet of the reactor at a relatively low temperature, there is first formed a basic copper containing precipitate of the type hereinbefore described, constituting a complex of reduceable copper ions, ammonium ions and hydroxyl ions. As the reaction mixture moves upwardly in the reactor, the particles of complex commence to undergo reduction. Still further up in the reactor, the small particles of copper metal formed upon reduction of the complex, commence to exert activity in causing the accelerated and increased precipitation of particles of copper metal from solution. Finally, near the discharge end of the reactor, cuprous and cupric ions carried in the aqueous solution are further reduced and precipitated out of solution so that, of the reduceable copper ions in an incremental portion of the solution entering the reactor, from 50 percent to 90+ percent thereof are recovered as copper metal.

It will be noted in referring to FIG. 2 that the tubular reactor 16 as there schematically illustrated is provided with a hydrogen distribution manifold 25 at the inlet end thereof so that the hydrogen gas introduced to the reactor may be passed into the reactor from a plurality of inlet openings arranged in the inlet of the reactor. It will further be noted that the tubular reactor 16 is provided with a dip tube 27 which is susceptible to extension into, or raising with respect to, the reactor so that the effective reactor volume can be selectively varied. The occurrence of the events relating to particle formation within the reactor, and diagrammatically illustrated in FIG. 2, is generally the sequence obtaining in the process of the present invention where steady state operation with modified plug flow occurs over the length of a reactor. Although the diagram illustrates particle formation within a tubular reactor operated non-isothermally, the same general sequence of particle formation and reduction mechanisms occur with the combined pre-heater and reactor system where the reactor is operated isothermally, and in general, the sequence obtains in the case of the other metals which can be recovered by the process of the invention, although the constitution of the intermediate precipitate formed varies.

It is to be noted that though certain process conditions and typical results generally attainable using the system and process flow arrangement depicted in FIG. 1 have been described as such conditions and results would typically apply in the case of an acidic feedstock containing copper values to be recovered, nickel and cobalt can also be continuously derived from such acid leach solutions, although it is preferable to recover them from basic solutions as hereinafter explained. The conditions as to solution impurity tolerance, ammonia to metal mole ratio, temperature and hydrogen partial pressure which are applicable to the batch and semi-continuous recovery of these related metals are well known in the art, and they can be continuously precipitated in the tubular reactor, provided sufficient hydrogen volumes and flow rates, supplemented by static mechanical agitation if needed, are provided to facilitate the particle formation and entrainment mechanisms hereinbefore described. It should be noted, however, that in the case of both nickel and cobalt, the most effective reduction mechanism is heterogeneous, and a suitable catalytic or heteronucleating impetus is required for the reduction to proceed at a satisfactory rate. Various compounds function catalytically to promote the reduction of nickel and cobalt, and the identity of these compounds is known to the art. In the process of the present invention, a preferred mode of procedure, when undertaking the continuous reduction of nickel or cobalt, is to utilize an inherent value in the leach solution, such as ferrous sulfate particles, in order to effect the heterogeneous reductions of these metals. This aspect of the invention is hereinafter described in greater detail.

Figure 3:
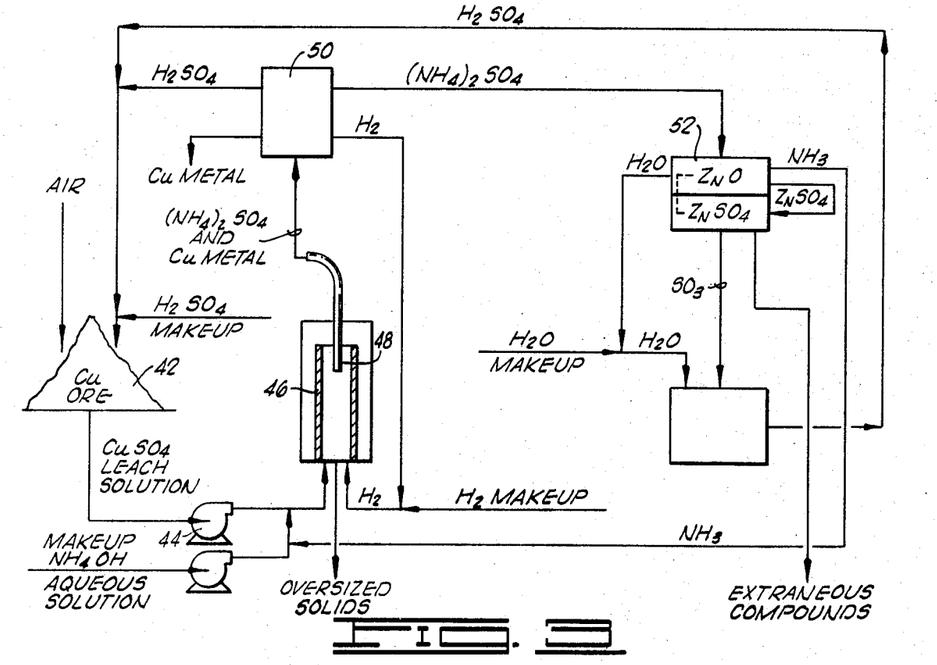
FIG. 3 is a schematic flow diagram illustrating a modified embodiment of the copper recovery process of the invention.

Prior to discussing the embodiment of the invention depicted in FIG. 3 of the drawings, it should be noted that instead of the pregnant, raw leach solution being derived from an acid leaching procedure, an ammoniacal copper leach solution may be employed, and the free ammonia to metal ratio then conditioned by the addition of an acid, such as sulfuric acid, thereto utilizing the pump 12. In such ammoniacal leaching operation, the ammonia to metal ratio should be maintained at a value of at least 4.5:1 for copper in order to assure that no precipitation of insoluble salts occurs in the passage of the copper leach solution through pump 10, thus choking or clogging this pump. In order to reduce the amount of ammonium sulfate formed upon neutralization, a portion of the unbound ammonia in the raw leach solution may be removed by heating the leach solution prior to pumping through pump 10. Adjustment of pH (to 7 or less) and the free ammonia to metal ratio by the addition of sulfuric acid is accomplished after pressurization at the reactor inlet.

FIG. 3 of the drawings illustrates in greater detail, a different embodiment of the invention. In this embodiment of the invention, there is further incorporated in the process of the invention, a technique for treating the ammonium sulfate by-product of the hydrogen reduction reaction carried out in the tubular reactor, so that sulfuric acid is regenerated and recycled to the leaching step. At the outset of the process depicted in FIG. 3, air and sulfuric acid are directed against a pile of copper containing ore 42 in a heap leaching or similar procedure. The pregnant leach solution containing soluble copper sulfate is then pumped by pump 44 to the tubular reactor 46, being pretreated enroute to the reactor by the addition of aqueous ammonium hydroxide to adjust the free ammonia to copper ratio in the manner hereinbefore described. Hydrogen gas is directed into the reactor 46 concurrently with the pregnant leach solution, and reduction of the copper ions in solution is carried out over the length of the reactor. The reactor 46 is operated at steady state conditions, with the flow rate of leach solution and hydrogen gas being adjusted to achieve modified plug flow with limited and localized backmixing within the reactor. The reactor is provided with an adjustable dip tube 48 so that the effective volume within the reactor can be adjusted as desired.

It will also be noted that the reactor is provided with a draw off tube at the inlet end thereof to permit any oversize solids which may be precipitated in the reactor to be periodically removed to assure that the reactor will be kept clean and will not become clogged over extended periods of usage.

The effluent from the reactor is directed to a separator 50 where the excess hydrogen gas is recovered and recycled to the reactor, and the copper metal is separated from the depleted leach solution. At this point, the depleted leach solution contains substantial amounts of ammonium sulfate formed during the initial pre-treatment of the pregnant leach solution, and further generated by the reduction reaction occurring in the reactor.

The depleted leach solution, or a slip stream thereof, containing concentrated amounts of ammonium sulfate and lesser amounts of other dissolved salts, is passed to a solid phase fluidized bed reactor 52 where the depleted leach solution is contacted with particles of zinc oxide at a temperature of about 932°F. As a result of the reaction which here occurs, the zinc oxide is converted to zinc sulfate, free ammonia gas is released and water is produced. The zinc sulfate particles are passed through a second reactor leg as a fluidized bed, and are there heated to a temperature of about 1832°F, so that the zinc sulfate is decomposed to zinc oxide and sulfur trioxide. The zinc oxide is then recycled to the fluidized bed reactor 52.

After passing through the fluidized bed reactor 52, the leach solution, containing residual compounds not altered by reaction with zinc oxide, is discharged from the reactor. The ammonia gas is recycled from the reactor 52 to the aqueous ammonium hydroxide pretreating solution. Water from the zinc oxide fluidized bed reactor is combined with the sulfur trioxide gas in a reactor 54 to produce sulfuric acid, which is then recycled to the leaching step. It may be noted at this point that the reaction between water and sulfur trioxide to produce sulfuric acid is a highly exothermic reaction, and the heat thus generated may be used to supply a portion of the heat employed in heating the reactor 46, or in heating the fluidized bed of zinc oxide, or in regenerating the zinc oxide from zinc sulfate.

It should be pointed out that other methods, presently well understood in the art, can also be used for treating the depleted leach solution containing dissolved ammonium sulfate for the purpose of regenerating ammonia and sulfuric acid, and that such methods of regeneration, followed by recycling of the acid and ammonia products can be incorporated in, and made a portion of, the overall process of the present invention.

A series of continuous reductions of pregnant leach solutions derived from leaching copper bearing ore with sulfuric acid were carried out in a laboratory tubular reactor. In each run, the run duration measured was the actual period of elapsed time that the leach solution was continuously charged to the reactor. The tubular reactor had an inside diameter of ¾ inch and a length of 30 inches (180 cc reactor volume).

Prior to starting the flow of leach solution through the reactor, the reactor was fed at operating conditions with distilled water. Again, following the termination of each run with the pregnant solution, processing conditions were maintained while switching to the distilled water feed to purge the system before shutdown. In the laboratory runs made, the hydrogen feed rate was measured with a high pressure, armored rotometer which was calibrated prior to each run against a dry test meter. The dry test meter was also used subsequently in the runs to monitor the excess hydrogen discharged from the reactor.

In the continuous reductions, the average reactor temperature was calculated as the overall integrated temperature of the reactor operated at non-isothermal conditions. The pregnant leach solution and hydrogen were charged to the reactor at ambient temperature (about 76°F) and the highest temperature reached in the reactor near the discharge end thereof was measured and noted as the maximum reactor temperature.

Reactor liquid residence times were measured for the several runs, and were the maximum lengths of time that the liquid leach solution feed stock remained in the reactor. This value was determined by dividing the volume of the reactor by the volumetric flow rate of the liquid feed at 60°F.

The fine copper powder produced in the several runs by the continuous reduction process of the invention exhibited high activity for oxidation to cuprous oxide. Samples of the depleted leach solution and product copper powder were therefore taken each 15 minutes, and the solution immediately separated from the copper powder by filtration. The copper powder was then washed with acetone to flush the mother liquor solution adhering to the surface. Low temperature oven drying was used to evaporate the residual acetone in two of the runs (Runs 1 and 2 hereinafter reported), but the washing and drying procedure was not used in a third run. Therefore, the presence of some cuprous oxide was noted in the third of the runs hereinafter reported when analyzed by X-ray diffraction analysis.

In the first and third runs, the pregnant acid leach solution was pre-treated with ammonium hydroxide to adjust the free ammonia to copper ion ratio, whereas in the second run the untreated acid leach solution was charged to the reactor.

The copper produced in the first run was examined by electron microscope and found to consist predominantly of crystalline copper of 1–2 microparticle size, with some sub-micron dendritic copper. Atomic absorption analysis (for iron) and emission spectra analysis for iron and other trace metals showed the purity of the copper product to exceed 99.7 weight percent in all cases.

The test conditions employed, and the results obtained are set forth in Tables I and II.

TABLE I

Conditions and Results

| Run Number | (Continuous Reduction) 1 | 2 | 3 | 4 | Units |
|---|---|---|---|---|---|
| Run Duration | 75 | 75 | 40 | 110 | minutes |
| $Cu^{++}$ Conc. of Feed | 0.148 | 0.143 | 0.143 | 0.145 | moles/liter |
| Feed Solution Rate | 104.2 | 98.2 | 99.0 | 103.5 | grams/min |
| Hydrogen Feed Rate | 0.210 | 0.213 | 0.205 | 0.203 | SCFM |
| Average Reactor Press. | 596 | 614 | 611 | 547 | psig |
| Average Reactor Temp. | 293 | 295 | 278 | 250 | °F |
| Maximum Reactor Temp. | 447 | 436 | 425 | 414 | °F |
| Reactor Liquid Residence Time (60°F) | 1.78 | 1.88 | 1.85 | 1.79 | minutes |
| Steady State Conversion of $Cu^{++}$ ions | 93.5 | 75 | 85 | 84 | % |
| Steady State Conversion Rate | 18.6 | 14.0 | 15.7 | 16.4 | Lbs $Cu°$/hr-ft$^3$ (reactor) |
| Excess Hydrogen Gas Rate | 0.172 | 0.180 | 0.177 | 0.195 | SCFM |
| Hydrogen Consumed | 19.2 | 23.0 | 17.0 | 4.6 | SCF/Lb $Cu°$ |
| Reactor Solids Accumulation* | 23 | 13 | 9 | — | Volume Percent |
| Estimated Liquid-Solid Mass Balance | 98 | 99 | 99 | — | wt % accountable |

*This parameter is the volume percent of the total reactor volume which is occupied by entrained solids during continuous steady state operation.

TABLE II

Product Quality

| Run Number | (Continuous Reduction) 1 | 2 | 3 | 4 |
|---|---|---|---|---|
| Electron Microscope Analysis, 6000 × | 2 Micron Particle Size | Not Analyzed | NA | NA |
| X-ray Diffraction Analysis of Samples | 100% $Cu°$ | 100% $Cu°$ | $Cu° + Cu_2O$ | 100% $Cu°$ |
| Atomic Absorption Iron, (PPM) | 571 (As Recovered) 472 (Acid Wash) | 282 (As Recovered) — | NA | NA |
| Emission Spectra Analysis Approximate Range, (PPM) | AL 10 – 100 | 10 – 100 | 10 – 100 | 10 – 100 |
| | Fe 333 – 1000 | 333 – 1000 | 333 – 1000 | 10 – 100 |
| | Mn 10 – 100 | 10 – 100 | 10 – 100 | 10 – 100 |
| | Mo 333 – 1000 | 333 – 1000 | 333 | 10 – 100 |
| | Ni 10 – 100 | 10 – 100 | 10 – 100 | 10 – 100 |
| | Si 10 – 100 | 10 – 100 | 10 – 100 | 100 – 600 |
| Total (Range) | 700 – 2400 | 700 – 2400 | 373 – 1733 | 150 – 1100 |
| Copper Purity Range (Less $O_2$)wt % | 99.93 – 99.76 | 99.93 – 99.76 | 99.96 – 99.83 | 99.99 – 99.89 |

As has been previously indicated, nickel and cobalt are also subject to the continuous reduction process of the invention. The reduction of nickel or cobalt is most effectively accomplished in the presence of either a foreign catalyst material for effecting and promoting the reduction by a reducing gas, or small seed particles of the metal to be reduced to effect nucleation and densification within the system resulting in reduction. The catalytic compounds effective in the nickel and cobalt reduction are well known in the art and include, among others, ferrous sulfate, sodium sulfide and chromium sulfate.

Nickel and cobalt can be reduced by hydrogen in both acid and basic solutions. In carrying out the present invention, it is preferred to recover the nickel from basic solutions, using a catalytic material, such as chromium sulfate, sodium sulfide and ferrous sulfate. Seeding with small, particulate nickel or cobalt metal particles can also be used to provide nucleation, but catalysis is preferred. Although chromium sulfate is the more effective catalyst, the ferrous sulfate is preferred for economic reasons, and because iron is frequently present in nickel or cobalt containing ores and can constitute an inherent source of catalyst material when such ores are leached.

In nickel and cobalt reductions, a leach solution preferably having a pH of from about 7 to about 12, and most suitably, from about 8 to about 11, is treated as necessary to provide free ammonia therein in a mol ratio to the metal to be reduced of from about 1.25:1 to about 6:1, with a mol ratio of from about 1.5 to about 2.5 being optimum. In an ammoniacal leach solution, such as is used to leach nickel sulfide ores, the excess ammonia in the leaching solution above that needed to establish the preferred free ammonia to nickel ratio may be removed through volatilization, or less suitably, through neutralization with sulfuric acid solution. Where sulfidization and oxidation leaching has been carried out, as in the case of treatment of nickel oxide ores, such as laterite and nickeliferous silicates, ammonia is added as necessary prior to hydrogen reduction to bring the pH, and the ammonia to metal mol ratio, up to the desired range.

The catalyst used for heteronucleating the nickel or cobalt is added at any time prior to hydrogen reduction, and with iron-rich source ores, such as laterite, may be formed in situ in the course of the leaching treatment. In order to avoid undesirable premature formation of the insoluble nickel-ammonium-ferrous-hydroxide complex hereinafter described, it is preferred to combine the free ammonia and ferrous ion in the leach solution as close to the inlet of the tubular reactor as possible without sacrifice of adequate opportunity for blending to a relatively homogeneous mixture before entering the reactor.

The concentration of catalytically active ions in the leach solution can range from about 0.1 gram per liter to about 10.0 grams per liter. When the preferred ferrous sulfate catalyst is utilized, an amount of from about 0.25 gram per liter to about 5 grams per liter of the ferrous ion is employed, and the most preferred concentration of this ion is from about 0.5 to about 2 grams per liter of leach solution.

In the nickel and cobalt reductions from a basic solution containing free ammonia in a mol ratio to reduceable metal ions of about 1.5:1 to about 6:1, the mechanism involved in the catalytic activation is not understood with certainty. It has been observed, however, that a fine, light amorphous precipitate is formed in this range of ammonia to metal mol ratios in basic leach solutions. This precipitate, by analysis, contains, in a combined state, nickel ions ($Ni^{++}$), ferrous and ammonium ions. It also apparently contains hydroxyl ions. The ferrous and hydroxyl ions are believed to be associated, in part, as $Fe(OH)_2$ within the complex, and it is possible that upon heating the leach solution carrying the complex, a highly active form of hydrogen is released from the $FE(OH)_2$, and functions to reduce the nickel ions in the associated complex in an essentially solid phase reaction. These reduced nickel atoms then act as nuclei constituting extremely small, highly active growth sites, and the nickel ions in solution are rapidly reduced thereon. The growth which thus occurs is very rapid, and the production of metallic nickel by reduction is limited only by the provision of adequate ferrous ions and ammonia to provide an optimum number of nucleation sites.

As the amorphous precipitate undergoes change upon heating to yield the metallic nickel, and nickel is concurrently reduced from solution through the growth reaction, the amorphous precipitate is progressively destroyed. If the reaction is allowed to proceed to completion, substantially all of the amorphous precipitate will be consumed, and the solid product yielded will be predominantly metallic nickel. In order to minimize the extent of contamination of the nickel metal product with the amorphous complex, it is preferred that average reaction temperatures exceeding about 300°F, and residence times of about 2 minutes, be employed in the tubular reactor. It is also usually preferred that the amount of catalyst used not exceed about 1.0 gram of ferrous or chromous ion per liter of leach solution, since this amount of catalyst yields enough nucleation sites for the most frequently encountered leach solutions containing up to about 15 grams of nickel sulfate per liter, and unneeded complex is formed when greater quantities of catalyst are used in equally or less concentrated pregnant leach solutions. It may be observed, however, that the amount of catalyst used will to some extent be governed by the physical character of the product which is desired, since provision of a relatively large number of nucleation sites, and consequent curtailment of the overall role played by growth in the total nickel metal yield will result in a lessened opportunity for agglomeration of the nickel particles to occur during product formation.

The amount of the amorphous complex formed is also, of course, a function of the free ammonia to metal mol ratio. Within the preferred range of catalyst concentration, as set forth above, maximum nickel metal yield with concurrent minimization of undestroyed complex appears to occur at a mol ratio of ammonia to metal of about 1.5:1.

As in the case of the reduction of copper hereinbefore described, the elongated tubular reactor has a length to diameter ratio of at least 10:1, and is preferably operated non-isothermally from ambient temperature at the inlet to a maximum temperature exceeding about 200°F adjacent the outlet. It may, however, be operated isothermally at a temperature exceeding about 200°F. It is preferred that the maximum temperature obtaining in the reactor, whether isothermally or non-isothermally operated, be between about 400°F and about 600°F for nickel and cobalt reductions.

The hydrogen partial pressure and overall or total pressure to be used is substantially the same as in the case of copper recovery by the method of the invention. The residence time in the tubular reactor preferably exceeds about 2 minutes in order to minimize contamination of the nickel or cobalt product with precipitated amorphous complex. The rate of flow of the hydrogen gas and leach solution through the reactor is such as to provide the modified plug flow with limited backmixing as hereinbefore described. The rate of flow must be higher than that needed in the reduction of copper metal, however, because of the greater density of nickel and cobalt metal, and the consequent increased carrying capacity requirement.

The metallic nickel or cobalt produced by hydrogen reduction in the tubular reactor can be recovered in several ways. Where a relatively large volume of the amorphous precipitate is discharged from the reactor concurrently with the nickel or cobalt, selective solvent extraction is difficult because of the fineness of the nickel powder. In this case, magnetic extraction of the nickel or cobalt is a preferred method of recovery. The amorphous complex can then be dissolved in either ammonium hydroxide or sulfuric acid and recycled in the process for further recovery of nickel therefrom. Where very little of the amorphous complex is present in the metallic product, separation of the metal from other insoluble salts, such as ammonium sulfate or ferric oxide can be accomplished by solvent extraction.

Figure 4:
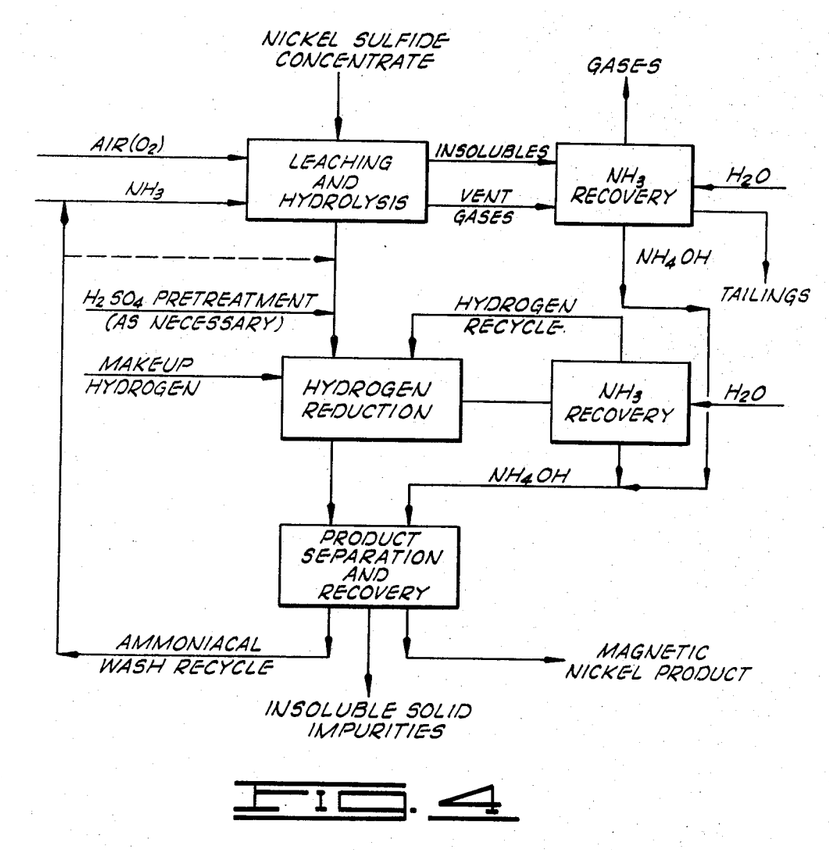
FIG. 4 is a schematic flow diagram illustrating an embodiment of the invention in which nickel is continuously recovered from an ammoniacal leach solution.

FIG. 4 is a block flow diagram broadly illustrating the procedure and sequence involved in the practice of the invention to recover nickel (or cobalt) from an ammine type leach solution. The pulverized nickel sulfide containing ore is subjected to leaching with an ammonium hydroxide solution, and the pregnant leach solution, after adjustment of pH and free ammonia content by the addition of sulfuric acid thereto as may be required, and after addition of ferrous sulfate catalyst as needed, is directed to the tubular reactor where hydrogen reduction is continuously carried out. The excess hydrogen and ammonia gas (which is yielded in the case of feed solutions containing more than 2 mols of ammonia per mol of reduceable metal) discharged from the reactor are separated by dissolving the ammonia gas in water. The hydrogen is recycled to the reactor, and the ammonium hydroxide can be used in product separation in the manner hereinafter described.

The product from the reactor will usually contain 60–90 weight percent free metallic nickel or cobalt, and varying amounts of the amorphous metal containing complex, some ammonium sulfate and a small amount of insoluble iron oxides. An ammonium hydroxide or sulfuric acid wash can be used to dissolve the complex for recycling purposes, concurrently with magnetic separation of the nickel metal. The ammonium hydroxide wash does not dissolve ferric iron salts or the ferric hydroxide, but will dissolve the complex, whereas sulfuric acid washing will result in the ferric iron compounds, as well as the complex, being dissolved, and purging of a portion of the acid recycle stream is therefore necessary to prevent excessive iron buildup.

In FIG. 5 of the drawings, a modification of the process of the present invention is illustrated by a schematic flow diagram. In this procedure, the difference in the reaction rates and conditions of nickel and copper are employed to advantage to achieve a two step reduction in which copper metal is initially recovered, and then the residual leach solution is further treated under different conditions to effect the recovery of nickel. An acid leach solution which has been used to win soluble copper and nickel values from an ore containing both metals, and also containing iron compounds leading to the formation of ferrous sulfate upon leaching, is directed to the pump 24, and is pressured to a total pressure sufficient, in conjunction with the partial pressure of hydrogen developed by the hydrogen added to the solution, to prevent boiling of the solution as it passes through the reactor. Again, according to preferred, yet optional, practice, aqueous ammonium hydroxide is added to the pregnant leach solution by means of the pump 26 to adjust the free ammonia to copper metal ratio to a range of from about 0.1:1 to about 1.6:1, and preferably from about 0.5:1 to about 1.2:1. The pH is also maintained on the acid side as previously described, and preferably in this embodiment of the invention is maintained less than 4.

The option of pre-heating both the pregnant leach solution and hydrogen gas prior to charging them to the reactor to effect continuous reduction is not illustrated in FIG. 5 of the drawings, but it will be understood from the discussion previously set forth herein, and particularly in relation to the description of FIG. 1, that such preheating may be carried out where it is desired to operate the tubular reactors 28 and 38 under isothermal conditions.

The pre-treated acid leach solution is passed into the tubular reactor 28 concurrently with hydrogen gas, and is subjected to the steady state reducing conditions over the length of the reactor as hereinbefore described. The reactor length, and the time during which the pregnant leach solution is subjected to reducing conditions in the reactor, are selected so that a major portion of the reduceable copper values carried in the leach solution is reduced, and copper metal is precipitated in the reactor and carried out of the reactor by the continuously flowing leach solution and the excess hydrogen gas passed through the reactor. Proper selection of the pH, the length of the reactor, the ammonia to reduceable copper ratio and the time over which the reducing conditions are applied (residence time for the leach solution within the reactor) result in very little of the nickel metal being reduced and precipitated since, under the conditions most effective for reduction of copper, the nickel responds to reduction relatively slowly, and very little of the nickel metal is produced.

The reaction products from the reactor 28 are passed to a separator 30 of the type hereinbefore described where the precipitated copper metal and the leach solution carrying the reduceable nickel values are separated from gaseous products, including the excess hydrogen passing from the reactor 28. The solid particulate copper product is recovered in a liquid cyclone 32, and the overhead from the cyclone, consisting essentially of the leach solution carrying the residual nickel ions and a small amount of ionic iron, is directed to a product accumulator 34. The nickel containing leach solution from the accumulator 34 is directed by means of a pump 36 to a second reaction stage of the system, which stage includes a second tubular reactor 38. Prior to entering the reactor 38, the leach solution is further conditioned by the addition of aqueous ammonium hydroxide from the pump 26 to adjust the free ammonia

TABLE III

| Run Number | 1 | 2 | 3 | 4 | Units |
|---|---|---|---|---|---|
| Run Duration | 175 | 75 | 45 | 35 | minutes |
| $Ni^{++}$ Conc. of Feed | 0.189 | 0.185 | 0.170 | 0.166 | moles/liter |
| $NH_3$ Feed Ratio | 1.28–5.50 | 2.20 | 4.10 | 2.30 | $NH_3$:$Ni^{++}$ moles |
| Feed Solution Rate | 96.3 | 206.1 | 133.0 | 159.8 | grams/min |
| $Fe^{++}$ Feed as $FeSO_4$ | 0.75 | 0.75 | 0.64 | 0.45 | grams/liter |
| Hydrogen Feed Rate | 0.220 | 0.310 | 0.275 | 0.265 | SCFM (approx) |
| Avg. Reactor Pressure | 477 | 495 | 498 | 500 | psig |
| Avg. Reactor Temperature | 281 | 199 | 247 | 211 | °F |
| Max. Reactor Temperature | 435 | 284 | 438 | 450 | °F |
| Reactor Liquid Resid. Time (60°F) | 1.90 | 0.90 | 1.37 | 1.12 | min |
| Steady State Depletion of $Ni^{++}$ ions | 72–98 | 71 | 99 | 99 | % |
| Steady State Depletion rate of $Ni^{++}$ ions | 15.9–20.1 | 31.4 | 27.2 | 31.7 | Lbs $Ni°/hr\text{-}ft^3$ |
| Tail-Gas Rate (includes $NH_3$) | 0.20 | N.A. | 0.24 | 0.24 | SCFM | to nickel mol ratio preferably to a range of from about 1.5:1 to about 2.5:1. The pressure of the solution entering the reactor is increased to from about 300 psig. to about 500 psig. by means of the pump 36. Hydrogen gas is introduced to the inlet of the reactor 38 in a manner hereinbefore described, and the maximum temperature in the reactor is at least 200°F, and preferably is between 300°F and 400°F.

Upon entering the reactor, an amorphous nickel-iron-ammonia complex is formed as a result of the presence of ferrous sulfate in the leach solution, and small particles of this complex are precipitated from the solution. As the solution carrying the complex moves downstream in the reactor 38, nucleation and catalysis proceed, with the result that a major portion of the reduceable nickel values in the solution are reduced to particulate nickel metal. Operating under the temperature and pressure conditions described, with the tubular reactor 38 operated nonisothermally from ambient temperature at the inlet end thereof to a temperature of about 400°F at the outlet thereof, and a liquid residence time (as measured at 60°F on liquid feed rates) of 2 to 3 minutes, up to 80 percent conversion of the nickel values contained in an original leach solution have been recovered as nickel metal as a result of the reduction occurring in the reactor 38. Since some of the amorphous complex particles may not be converted to nickel metal in the reactor 38, and emerge with the particulate nickel metal, thorough acid or ammonia washing of the nickel product is necessitated in order to separate the unconverted precipitate from the pure nickel metal. The reaction products from the reactor 38 are directed to a separator 40 which is similar to the separator 30 used for removing copper from the depleted leach solution. In the separator 40, the nickel metal and depleted leach solution are separated from the excess hydrogen gas and other gases formed in the course of the reaction. These gases are passed to the condenser 42 where condensible gases are separated from hydrogen gas, and the hydrogen is then recycled to the reactors 28 and 38.

In Table III are set forth the operating conditions and results obtained in a series of runs carried out for the purpose of recovering nickel from a nickel containing ammine solution using continuous hydrogen reduction. The tubular reactor employed had a diameter of ¾ inch and a length of 30 inches. In the first of the runs, the ammonia feed ratio was varied periodically during the run from an initial free ammonia to nickel ion mol ratio of 1.28:1, to a mol ratio of 3.6:1 effected sixty minutes after commencement of the run, to a final mol ratio of 5.5:1 ninety minutes after commencement of the run. Product samples taken at these several ammonia to metal mol ratios indicated a nickel depletion of 80 percent at the 1.28:1 mol ratio, 72 percent at the 3.6:1 ratio, and 98 percent at the 5.5:1 mol ratio.

The solid product yielded by the reduction runs included fine metallic nickel, the amorphous nickel-containing complex and solid impurities. Treatment of the solid product of each run with nitric acid, followed by nickel analysis of the acid solution, showed that the total solid product contained about 90 weight percent nickel in the case of Run 1, 55 weight percent nickel in the case of Run 2, 70 weight percent nickel in the case of Run 3 and 80 weight percent nickel in the case of Run 4. These results indicate the total nickel ion content resulting from the solution in acid of both the complex and nickel metal. Sulfuric acid selective extraction of the product solids yielded in Run 3 indicates that in excess of 55 weight percent of the total solid product was metallic nickel. The total metallic nickel product was probably substantially higher than this, because the fineness of the product nickel enabled some of the nickel to be re-dissolved in the acid during washing of the product.

In the continuous hydrometallurgical recovery of silver from leach solutions containing silver values, the relative ease with which silver can be reduced, by virtue of its position in the electromotive series, allows the continuous reduction to be carried out over a wide range of pH values for the leach solution. Leaching is usually accomplished with nitric acid. The pregnant leach solution can be introduced to the elongated, tubular reactor without ammonia pre-treatment at a pH as low as about 1.5, or it may be pre-treated with ammonia to yield an ammoniacal solution of silver nitrate and ammonium nitrate having a pH as high as about 11.5. It is preferred to pre-treat the leach solution with ammonia to provide a free ammonia to silver ion mol ratio of from about 0.5 to abOut 4.5 (pH from about 6 to about 11.2). Even larger amounts of ammonia can be used, but the process cannot be practiced as economically in such event. A mol ratio range which has been found to be especially suitable is from about 1 to about 3, and for most silver concentrations in the leach solution, a mol ratio of free ammonia to metal ion of about 2.5 is optimum.

tubular reactor having a length of 30 inches and a diameter of ¾ inch. The conditions utilized and the results obtained in these runs are set forth in Table IV.

TABLE IV

| Run Number | 1 | 2 | 3 | 4 | 5 | 6 | 7 | Units |
|---|---|---|---|---|---|---|---|---|
| Run Duration | 110 | 13 | 11 | 9 | 9 | 30 | 45 | minutes |
| $Ag^+$ Conc. of Feed | 0.221 | 0.221 | 0.229 | 0.217* | 0.198 | .0954 | .0954 | moles/liter |
| $NH_3$:$Ag^+$ Feed Ratio | 1.45 | 1.43 | 1.43 | 1.50* | 1.54 | 0 | 1.03 | moles $NH_3$/moles $Ag^+$ |
| Feed Rate | 121.0 | 115.4 | 122.7 | 118 | 125.0 | 120.5 | 119.1 | g/minute |
| $H_2$ Feed Rate | 0.190 | 0.165 | 0.184 | 0.188 | 0.177 | 0.172 | 0.142 | SCFM |
| Avg. Reactor Pressure | 502 | 486 | 488 | 493 | 490 | 492 | 489 | psig |
| Max. Reactor Temperature | 348 | 385 | 350 | 333 | 340 | 336 | 357 | °F |
| Reactor Liquid Resid. Time (60°F) | 1.53 | 1.56 | 1.47 | 1.57* | 1.45 | 1.54 | 1.58 | minutes |
| Depletion of $Ag^+$ ions in Feed | 60 | 97 | 93 | 96 | 89 | 40 | 99 | percent |

*These values are estimated values.

The by-products of the silver reduction from a nitric acid leach solution are nitric acid and ammonium nitrate. Which of these by-products predominates in the reactor effluent stream depends upon the free ammonia to silver mol ratio in the leach solution fed to the reactor. Where a mol ratio of less than about 1 is employed, nitric acid is the predominant by-product, and recycle of the acid to the leaching step is feasible. For $NH_3$:$Ag^+$ mol ratios greater than 1, the ammonium nitrate is the predominant by-product. The salt may be recovered by known procedures, and marketed as fertilizer.

As in the case of the copper and nickel reductions, a stoichiometric excess of hydrogen is continuously introduced to the tubular reactor in the course of recovery of silver. The total pressure used in the reactor is sufficient to prevent boiling of the leach solution passing therethrough, and a hydrogen partial pressure of at least 50 psig. is preferably employed. The maximum temperature used in the reactor can range from about 200°F to about 600°F, and is preferably from about 300°F to about 400°F. Either isothermal or non-isothermal operation can be carried out. In the continuous reduction of silver, liquid residence times in the reactor at 60°F can range from about 0.1 to about 20 minutes, with from one to four minutes being preferred.

Where gold is to be recovered by the method of the present invention, an aqua regia leaching solution is used, and it is necessary that all wetted surfaces used in the system be glass or an appropriate synthetic resin. In the hydrometallurgical reduction of gold, it is preferred not to use ammonia pre-treatment of the leach solution, and reduction to metallic gold occurs from leach solutions having of pH of less than 1.

Most gold bearing ores also contain silver. In such cases, the use of aqua regia will leach both metal values, but the silver chloride formed will not remain in the leach solution, but will be precipitated. The gold in the leach solution can be recovered by continuous hydrometallurgical reduction. The precipitated silver chloride can be dissolved in an ammonical solution, and then passed through a tubular reactor under the previously described conditions to recover metallic silver.

A number of continuous reduction runs were carried out in which nitric acid solutions of silver nitrate were, with and without ammonia pre-treatment, charged to a Wet analysis of the product solids of Runs 1 and 5 showed the solid products of these two runs to contain 81.5 weight percent and 98.4 weight percent of pure silver metal, respectively.

The specific reaction conditions and parameters which have been herein identified, and the schematic flow diagram shown in the drawings are intended to be illustrative of the present invention as it may be carried out according to several preferred modes of practice. The examples and drawings are illustrative of the basic principles which underlie the invention, and specific reaction conditions and the reactants employed can be varied to some degree without departure from these basic principles. Hydrogen gas, for example, has been the gas which has been prevalently referred to throughout the specification as effecting the reduction of copper metal ions in accordance with the principles of the invention. Carbon monoxide may also be utilized, with proper adjustments, as well as other reducing gases. Selective adjustment of reaction conditions may be employed to vary and control the size of the product particles of metal which are yielded, and some adjustment of conditions, as will be appreciated from the pre-existing body of technology in this general area, will be required to obtain optimum conversion of one type of metal, such as cobalt, as contrasted with another type of metal, such as copper. These changes and modifications can be effected within the scope and spirit of the present invention, and without departure from the basic principles of continuous, modified plug flow in a tubular reactor which constitute the most essential considerations in the resent invention. Changes and innovations of this type are therefore deemed to be within the pale and reach of the inventive concepts here first presented, except as the limits of the invention must be necessarily found in the appended claims, when a reasonably broad construction is given thereto.

What is claimed is:

1. A process for recovering a metal selected from the group consisting of copper, nickel, cobalt, silver and gold from a raw material containing at least one of said metals in a free or combined state, said process comprising:

leaching the raw material with an aqueous acidic or ammoniacal leach solution to dissolve in the leach solution, the metal values to be recovered;
   adjusting the pH and free ammonia concentration of the pregnant leach solution to provide a pH and a mol ratio of free ammonia to metal such that the metal to be recovered will precipitate from the solution when contacted with hydrogen gas, and with any needed particulate catalyst, in a tubular reactor under the conditions hereinafter set forth;

continuously charging the solution to a tubular reactor concurrently with hydrogen gas and any needed particulate catalyst, and moving the solution, hydrogen gas and catalyst continuously and concurrently through the length of the reactor under substantially steady state conditions and at a rate to entrain and carry through the reactor, solid particles precipitated out of solution during transit of the tubular reactor, the solution being heated to a temperature of at least 200°F prior to passing out of the discharge end of the reactor and passing from the reactor at a temperature in excess of 200°F, and the solution being maintained under sufficient total pressure in the reactor to prevent boiling of the solution and to provide a hydrogen partial pressure of at least 50 psig., the quantity of hydrogen gas being passed through the reactor concurrently with the pregnant leach solution being in excess of that required for stoichiometric reduction of the metal values to be recovered, and sufficient in quantity and flow rate to agitate the solution to a state of modified plug flow in which localized, limited backmixing occurs, and in which the mixture, is of heterogeneous character over the length of the reactor; then separating the metal powder to be recovered from the effluent mixture discharged from the reactor.

2. A process as defined in claim 1 wherein the metal to be recovered is copper, and the pH of the pregnant leach solution is adjusted to a value not exceeding 7.

3. A process as defined in claim 2 wherein prior to charging the solution to the tubular reactor, free ammonia is incorporated in the solution in a mol ratio to the ions of the copper metal to be recovered of from about 0.1:1 to about 1.6:1.

4. A process as defined in claim 1 wherein the tubular reactor has a length to diameter ratio of at least 10:1.

5. A process as defined in claim 1 wherein the solution and hydrogen and any necessary particulate catalyst are charged to the reactor at ambient temperature, and a constantly increasing thermal gradient is maintained in the reactor during its steady state operation from its inlet end to its outlet end.

6. A process as defined in claim 1 wherein the tubular reactor is operated isothermally over its length at a temperature exceeding 200°F.

7. A process as defined in claim 5 wherein the temperature within the reactor near its discharge end exceeds about 400°F.

8. A process as defined in claim 1 wherein the total pressure in the reactor is from about 250 psig. to about 600 psig.

9. A process as defined in claim 3 wherein said mol ratio of ammonia to copper ions is from about 0.5:1 to about 1.5:1.

10. A process as defined in claim 1 wherein leaching of said raw material results in the formation of ferrous sulfate in the pregnant leach solution and said raw material contains copper and a metal selected from the group consisting of nickel and cobalt;

and wherein said process is further characterized by the additional steps of adjusting the reaction mixture residence time and flow rate, and pH and free ammonia content of the solution, to remove a major portion of the copper value from the solution by hydrogen reduction in the tubular reactor, while allowing a major portion of the nickel or cobalt compounds to remain in solution; then adjusting the pH of the pregnant leach solution to a value of from about 7 to about 12, and adjusting the free ammonia to cobalt or nickel mol ratio to a value of from about 1.5:1 to about 6:1; and passing the adjusted pregnant leach solutions continuously through a second tubular reactor concurrently with hydrogen gas is modified plug flow under steady state conditions to precipitate metallic nickel or cobalt therefrom.

11. A process as defined in claim 3 wherein the leaching of the raw material is carried out using an aqueous sulfuric acid solution.

12. The process as defined in claim 11 and further characterized by the steps of:

treating the effluent mixture discharged from the reactor to regenerate ammonia and sulfuric acid from ammonium sulfate contained in the effluent mixture; then recycling the ammonia to the free ammonia incorporation step; and recycling the sulfuric acid to the ore leaching step.

13. The process defined in claim 10 wherein the tubular reactor has a length to diameter ratio of at least 10:1.

14. A process as defined in claim 11 wherein the solution and hydrogen are charged to the reactor at ambient temperature, and a constantly increasing thermal gradient is maintained in the reactor from its inlet end to its outlet end.

15. A process as defined in claim 14 wherein the maximum temperature within the reactor exceeds 400°F, and the minimum total pressure in the reactor is at least 350 psig.

16. A process as defined in claim 15 wherein said mol ratio of ammonia to copper ions is from about 0.5:1 to about 1.5:1.

17. A process as defined in claim 3 wherein the leaching of the raw material is carried out using an aqueous ammoniacal solution.

18. A process as defined in claim 1 wherein said tubular reactor extends vertically.

19. A process as defined in claim 1 wherein said metal to be recovered is nickel or cobalt, and wherein the pH of said pregnant leach solution is adjusted to from about 7 to about 12, and the free ammonia to metal ion ratio thereof is adjusted to from about 1.25:1 to about 6:1, and a catalyst active in the heterogeneous hydrometallurgical reduction of the metal to be recovered is added to said pregnant leach solution.

20. A process as defined in claim 19 wherein the added catalyst is ferrous sulfate.

21. A process as defined in claim 20 wherein ferrous sulfate catalyst is added to the pregnant leach solution in an amount of from about 0.25 grams per liter to about 5 grams per liter.

22. A process as defined in claim 19 wherein the mol ratio of free ammonia to metal ion in the leach solution is adjusted to from about 1.5 to about 2.5.

23. A process as defined in claim 1 wherein said metal to be recovered is silver, and the free ammonia to silver ion ratio of the pregnant leach solution is adjusted to from 0 to about 4.5.

24. A process as defined in claim 23 wherein the maximum temperature in the tubular reactor is from about 200°F to about 600°F.

25. A process as defined in claim 23 wherein said mol ratio is from about 1 to about 3.

26. A process for continuously hydrometallurgically reducing copper ions in an aqueous solution to copper metal comprising:

placing free ammonia in the solution in an ammonia to copper metal ion mol ratio of from 0.5:1 to about 1.5:1;

continuously advancing through a fixed tubular reactor the free ammonia containing solution and hydrogen gas in intimate admixture with each other from one location in the reactor where the mixture is at ambient temperature to another location in the reactor where the mixture is heated to at least 200°F while agitating the mixture without homogenizing it over its path of travel during the advance, such advance being at a rate, and agitation being of a magnitude, sufficient to entrain solid particles of an ammonia-copper ion complex formed therein and sufficient to agitate the solution to a state of modified plug flow in which localized, limited back-mixing occurs; and     adjusting the distance dimension of the advance to allow a major portion of the copper ions in the solution at the beginning of the advance to be precipitated as copper metal.

27. A process for recovering from an aqueous solution, a high purity metal, selected from the group consisting essentially of copper, nickel and cobalt, said process comprising:

dissolving inorganic salts of the metal values to be recovered in an aqueous solution;

adjusting the pH of the metal salt containing aqueous solution to a value not exceeding 7; then     continuously charging the solution to a tubular reactor concurrently with hydrogen gas, and moving the solution and hydrogen gas concurrently through the length of the reactor under substantially steady state conditions and at a rate to entrain and carry through the reactor, solid particles precipitated out of solution during transit of the tubular reactor, the mixture being heated to a temperature of at least 200°F prior to passing out of the discharge end of the reactor and passing from the reactor at a temperature in excess of 200°F, the quantity of hydrogen gas being passed through the reactor concurrently with the solution being in excess of that required for stoichiometric reduction of the metal values to be recovered, and sufficient in quantity and flow rate to agitate the solution to a state of modified plug flow in which localized, limited backmixing occurs, and in which the solution is of heterogeneous character over the length of the reactor; then     separating the metal powder from the effluent mixture discharged from the reactor.

\* \* \* \* \*